United States Patent Office 3,118,938
Patented Jan. 21, 1964

3,118,938
PREPARATION OF AMINO PRODUCTS FROM CYCLODODECATRIENE-1,5,9
Archibald P. Stuart, Media, and Charles E. Scott, Drexel Hill, Pa., assignors to Sun Oil Company, Philadelphia, Pa., a corporation of New Jersey
No Drawing. Filed Nov. 28, 1962, Ser. No. 240,708
7 Claims. (Cl. 260—563)

This invention relates to the reaction of cyclododecatriene-1,5,9 to form novel amino compounds which are reaction products between dicyclic conjugated diene product formed as an intermediate in the reaction and N-lithio primary aliphatic diamine used in the reaction.

It is known that cyclododecatriene-1,5,9 can be prepared by contacting butadiene with a catalyst formed from titanium tetrachloride and diethyl aluminum chloride in a hydrocarbon solvent. This catalyst system produces the trans-trans-cis form of the triene. It is also known that cyclododecatriene-1,5,9 can be prepared by contacting butadiene with a catalyst system which is aluminum triethyl together with either chromyl chloride or chromic chloride in a hydrocarbon solvent. The latter type of catalyst system produces mainly the trans-trans-trans form of the triene but also causes the formation of substantial amounts of the trans-trans-cis isomer.

The present invention provides a method for converting either form of cyclododecatriene-1,5,9 into novel amino compounds which are reaction products between bicyclo-[5.5.0]-dodecadiene, which is formed as an intermediate in the reaction, and N-lithio primary aliphatic diamine which functions both as a catalyst and reactant during the reaction. The bicyclodiene intermediate is a result of structural rearrangement of the cyclododecatriene-1,5,9 and comprises two conjugated isomers as follows:

A. Bicyclo-[5.5.0]-1,7-dodecadiene:

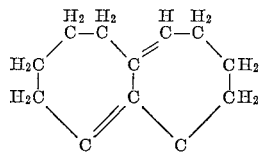

B. Bicyclo-[5.5.0]-Δ$^{1,7,2}$-dodecadiene:

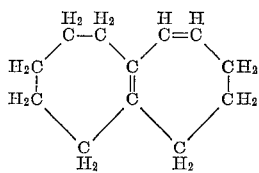

During the reaction one or both of these conjugated isomers react with the N-lithio aliphatic diamine to form amino products. A lower boiling amino product is formed which has one (ω-aminoalkyl) amino group attached to the bicyclo hydrocarbon nucleus. This mono-addition product appears to be at least mainly the reaction product of isomer B, having the (ω-aminoalkyl) amino group attached primarily at the 3-position although some addition at the 2-position may also occur. There is also produced higher boiling amino material which may be a bis-addition product formed by reaction at the two double bond positions of isomer A and thus having (ω-aminoalkyl) amino groups attached at both the 2-position and 8-position. However it is not known with certainty whether the higher boiling amino material is a result of this or some other reaction mechanism. In any event both relatively low and relatively high boiling amino products are obtained. These amino products are good emulsifiers and can be used in preparing various emulsified products and as ore flotation agents.

According to one embodiment of the invention, cyclododecatriene-1,5,9 is converted to amino derivatives of bicyclo-[5.5.0]-dodecadiene by contacting the triene at an elevated temperature with a catalyst system comprising N-lithioethylene diamine ($H_2NCH_2CH_2NHLi$) dissolved in ethylene diamine. This system can be prepared by reacting lithium metal with an excess of ethylene diamine at an elevated temperature, for example, 90–110° C., until all of the lithium has gone into solution. Conversion of the cyclododecatriene-1,5,9 is effected by mixing it with the resulting catalyst system and maintaining the mixture at a temperature in the range of 50–200° C., more preferably 80–120° C. for a time sufficient to effect substantial conversion. Under these conditions the cyclododecatriene-1,5,9 rearranges to produce the diene isomers shown above and the hydrocarbon product further reacts in the presence of the catalyst system to produce material having one of the nitrogen atoms from the diamine bonded to a ring carbon atom of the hydrocarbon intermediate. The exact mechanism of this reaction is not known with certainty but is thought that the intermediate hydrocarbon product reacts with the N-lithioethylene diamine, following which an interchange between lithium and hydrogen of the excess ethylene diamine occurs to produce additional amounts of N-lithioethylene diamine. In any event, the overall effect is to combine ethylene diamine with the conjugated diene intermediate material to produce the amino products.

The final reaction mixture generally contains, in addition to the amino products, unreacted bicyclo hydrocarbon isomers referred to above and it may also contain an amount of unconverted cyclododecatriene. It also generally contains a substantial amount of polymeric hydrocarbon product. The yield of amino product resulting from the reaction varies with changes in reaction conditions. Formation of the amino product is favored by increasing reaction time, increasing the amount of excess ethylene diamine and increasing reaction temperature. In order to increase the rate of reaction the lithium should be employed in substantial molar excess of the cyclododecatriene-1,5,9. Preferably the molar ratio of lithium to the triene should be in the range of 5:1 to 20:1.

After the reaction has been conducted for a desired time such as, for example, 0.5–20 hours, the reaction mixture is chilled to ice bath temperature and water is added to hydrolyze the lithium compound. The mixture is then extracted with a suitable solvent to remove the reaction products. Extraction with a solvent such as propane or butane removes mainly hydrocarbon material from the reaction mixture, while extraction with a solvent such as ether removes both hydrocarbon and the amino product. Treatment of the ether extract with dilute HCl will remove the amino product and neutralization of the resulting aqueous phase with caustic soda will release the amino product as an oily material. Extraction of the neutralized aqueous phase with ether will facilitate the isolation of the amino product. The product then can be distilled, if desired, to separate the material containing only one ethylene diamine group from higher boiling amino material.

For convenience in the foregoing description the primary diamine employed has been referred to as ethylene diamine. However the invention can also be practiced with other diamines which will dissolve their lithium derivatives. Polymethylene diamines having 2–6 methylene groups are suitable generally, examples being propylene diamine and hexamethylene diamine. The number of carbon atoms obtained in the amino products of the reaction will depend upon the particular diamine selected.

The intermediate bicyclo hydrocarbon product which reacts to yield the amino derivatives can be characterized as follows. A fraction of hydrocarbon product distilled from the reaction mixture and boiling substantially higher than cyclododecatriene-1,5,9 shows two close boiling hydrocarbon peaks by vapor phase chromatography. Comparison of these peaks with the peaks of a known hydrocarbon mixture used as a standard indicates that the boiling point is about 253° C. at atmospheric pressure. This compares with the normal boiling point for cyclododecatriene-1,5,9 of about 227° C. The isomer designated above as B is slightly higher boiling than isomer A. Ultraviolet absorption of the hydrocarbon products shows a peak in the neighborhood of 238–244 millimicrons and an extinction coefficient of about 5500–5600. By infrared absorption a carbon-carbon stretching band is found at 6.25 microns, which is characteristic for conjugated double bonds. By nuclear magnetic resonance the ratio of aliphatic protons to vinylic protons is of the order of 8:1 and the ratio of aliphatic protons on carbon atoms which are alpha to the double bonds to those on carbon atoms which are non-alpha is about 1:1 for each hydrocarbon product. These characteristics show that the two hydrocarbon intermediate products have the structures illustrated in the formulas above.

The amino products, which are obtainable from the reaction mixture by extraction with dilute HCl followed by neutralization with caustic soda, can be distilled to separate amino product having only one (ω-aminoalkyl) amino group from higher boiling amino material. The mono-addition amino product formed when N-lithioethylene diamine is used can be obtained as a fraction boiling in the range of 160–175° C. at 5 mm. Hg pressure (the pressure being measured at the receiver rather than in the distillation pot). Typically this fraction will also contain a substantial amount of hydrocarbon material and hence its nitrogen content generally will be somewhat lower than the theoretical value for the mono-addition product. By infrared absorption this fraction shows a nitrogen-hydrogen stretching band at about 3.2 microns. Nuclear magnetic resonance indicates the presence of one $NH_2$ group. It also shows the presence of allylic hydrogen in an amount indicating one double bond and the presence of only a small amount of vinylic hydrogen. These facts indicate that this amino product is formed mainly from isomer B by addition of an ethylene diamine group at one of the carbons adjacent the double bond which is not common to the two rings, since addition of one such group adjacent either double bond position of isomer A would leave a vinylic proton in the molecule. Also, for isomer B, the double bond which is common to the two condensed rings would not be expected to provide a reactive site for forming the amino compound. Whether the ethylene diamine group addition to isomer B occurs at the 2-position or 3-position or both is not known with certainty but it seems more likely that it occurs at least mainly at the 3-position because of steric hindrance. Hence the amino product having one ethylene diamine group appears likely to conform at least mainly to the following structure:

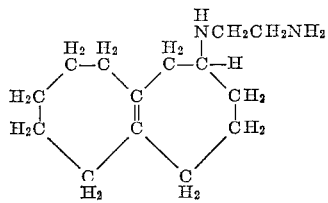

It should be understood, however, that such structure for the mono-addition product is not known with certainty and hence that the product cannot be specified in terms of exact structure.

The higher boiling amino product may well be formed by the addition of an ethylene diamine group at each of the double bond positions of isomer A. However, this is not known with certainty and hence its structure likewise cannot be specified with exactitude.

The following examples are specific illustrations of the invention:

*Example I*

Three liters of ethylene diamine are heated to a temperature of about 100° C. and lithium metal is added in amount of 150 g. while the mixture is being stirred. Reaction between the lithium and the diamine occurs with hydrogen being released, and the mixture is maintained at about 100° C. until all of the lithium has reacted. The resulting solution is colorless. 162 g. of cyclododecatriene-1,5,9 (trans-trans-cis isomer) are then introduced, causing the color of the mixture to turn reddish-brown. The mixture is maintained at a temperature of about 100° C. for 2 hours to permit the reaction to proceed. It is then cooled by means of an ice bath, and water is mixed into the reaction mixture to hydrolyze the lithium compound. The mixture is then extracted with ether to remove the hydrocarbon and amino products. The resulting ether solution is extracted with dilute HCl to remove the amino compounds and then is evaporated to yield a product from which about 18 g. of a mixture of the previously described isomers A and B, which distill at about 66° C. at 2 mm. Hg absolute pressure (receiver pressure), are obtained, leaving 50 g. of residue which is probably a polymer formed from the hydrocarbon. By ultraviolet absorption the mixture of isomers is characterized by a peak at 238 millimicrons and an extinction coefficient of 5500. By infrared absorption a carbon-carbon stretching band is found at 6.25 microns, which is characteristic for conjugated double bonds.

The HCl extracted amino material is neutralized with caustic soda and extracted with ether. Evaporation of the ether yields 87 grams of amino compounds. Vacuum distillation of this material produces about 14 g. of a compound boiling at about 138° C. at 2 mm. Hg absolute pressure (receiver pressure). This product, which is mainly an amino compound containing only one ethylene diamine group, contains about 10.1% nitrogen and shows by infrared absorption a nitrogen-hydrogen stretching band at about 3.2 microns. The higher boiling material is amino product of higher molecular weight.

*Example II*

The procedure of the preceding example was repeated using 710 ml. of ethylene diamine, 35.5 g. of metallic lithium and 38.3 g. of trans-trans-cis cyclododecatriene-1,5,9. After addition of the triene the reaction was again carried out at about 100° C. for a time of 2 hours. The reaction product was worked up in a similar manner as before. About 20 g. of hydrocarbon material was obtained of which about one-half was unreacted cyclododecatriene. Vacuum distillation of the hydrocarbon material gave about 4 g. of a bicyclo-[5.5.0]-dodecadiene fraction which distilled at 85–95° C. at 5 mm. Hg absolute pressure at the receiver and 6 g. of dark resinous residue. Vacuum distillation of the amino material gave about 10 g. of mono-addition product distilling at 160–175° C. at 5 mm. Hg absolute pressure at the receiver and 5 g. of higher boiling amino material.

The 85–95° C. fraction analyzed 88.3% C and 11.5% H (theory: 88.9% C, 11.1% H). By vapor phase chromatography it showed two peaks indicating two closely boiling hydrocarbons having normal boiling points in the vicinity of 253° C. Material trapped from the chromatograph effluent and corresponding to the first peak had a refractive index of 1.5244. Analysis by infrared and ultraviolet absorption and by nuclear magnetic resonance showed that these hydrocarbons corresponded to isomers A and B supra. The mixture of hydrocarbons by ultraviolet absorption exhibited a peak at 244 millimicrons and an extinction coefficient of 5600, and infrared showed a carbon-carbon stretching band at 6.25 microns. Nuclear magnetic resonance tests showed proton type ratios consistent with the structures of isomers A and B.

The 160–175° C. fraction of amino material by infrared absorption exhibited a nitrogen-hydrogen stretching band at 3.2 microns. By nuclear magnetic resonance this material was shown to have one $NH_2$ group, allylic hydrogen indicative of one double bond and only a small amount of vinylic hydrogen, thus indicating that it was mainly an addition product of the diamine reactant with isomer B, with the addition occurring at the double bond not common to the two condensed rings.

Results similar to those described in the foregoing examples are obtained when other primary aliphatic amines having 3–6 methylene groups are substituted for the ethylene diamine.

This application is a continuation-in-part of applicants' copending application Serial No. 833,380, filed August 13, 1959, now abandoned.

We claim:

1. Method of forming an amino compound which comprises reacting cyclododecatriene-1,5,9 at a temperature in the range of 50–200° C. with a solution of N-lithiopolymethylene diamine having 2–6 methylene groups dissolved in such polymethylene diamine whereby the cyclododecatriene-1,5,9 rearranges to bicyclo-[5.5.0]-dodecadiene and an amino reaction product between said dodecadiene and the polymethylene diamine is formed, said dodecadiene being characterized by a boiling point of about 253° C. at atmospheric pressure, an ultraviolet absorption peak at about 238–244 millimicrons and an extinction coefficient of about 5500–5600, and separating said amino reaction product from the reaction mixture.

2. Method according to claim 1 wherein the temperature is in the range of 80–120° C.

3. An amino compound prepared according to claim 1.

4. Method according to claim 1 wherein said cyclododecatriene is the trans-trans-cis isomer.

5. Method of forming an amino compound which comprises reacting cyclododecatriene-1,5,9 with a solution of N-lithioethylene diamine in ethylene diamine at a temperature in the range of 50–200° C. whereby the cyclododecatriene-1,5,9 rearranges to bicyclo-[5.5.0]-dodecadiene and an amino reaction product between said dodecadiene and the polymethylene diamine is formed, said dodecadiene being characterized by a boiling point of about 253° C. at atmospheric pressure, an ultraviolet absorption peak at about 238–244 millimicrons and an extinction coefficient of about 5500–5600, and separating said amino reaction product from the reaction mixture.

6. Method according to claim 5 wherein the temperature is in the range of 80–120° C.

7. Method according to claim 6 wherein said cyclododecatriene is the trans-trans-cis isomer.

No references cited.